(12) United States Patent
Inamdar

(10) Patent No.: US 9,557,716 B1
(45) Date of Patent: Jan. 31, 2017

(54) MULTIPURPOSE MAGNETIC CROWN ON WEARABLE DEVICE AND ADAPTER FOR POWER SUPPLY AND AUDIO, VIDEO AND DATA ACCESS

(71) Applicant: QUALCOMM Incorporated, San Diego, CA (US)

(72) Inventor: Prasanna Chandrakant Inamdar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/859,344

(22) Filed: Sep. 20, 2015

(51) Int. Cl.
G04B 47/00 (2006.01)
G04G 17/06 (2006.01)
H01R 24/38 (2011.01)
H01R 13/62 (2006.01)
G04G 21/00 (2010.01)
G04G 19/00 (2006.01)
H04B 1/3827 (2015.01)

(52) U.S. Cl.
CPC ............. *G04G 17/06* (2013.01); *G04G 19/00* (2013.01); *G04G 21/00* (2013.01); *H01R 13/6205* (2013.01); *H01R 24/38* (2013.01); *H04B 1/385* (2013.01); *H04B 2001/3861* (2013.01)

(58) Field of Classification Search
CPC .... G04G 17/06; G04G 21/00; H01R 13/6205; H01R 24/38; H04B 1/385; H04B 2001/3861

USPC ............ 368/10, 69, 185–187, 190, 203–205, 368/319–321; 439/39, 580
See application file for complete search history.

(56) References Cited

U.S. PATENT DOCUMENTS

| 6,396,771 B2 * | 5/2002 | Paratte ................... G04C 10/00 368/203 |
| 6,625,087 B2 * | 9/2003 | Paratte ................... G04G 21/00 368/69 |
| 6,955,552 B2 * | 10/2005 | Ferri ..................... H01R 33/945 200/51.09 |
| 7,229,323 B2 * | 6/2007 | Robin .................... G04C 10/00 439/638 |
| 7,618,260 B2 | 11/2009 | Daniel et al. |
| 7,625,227 B1 * | 12/2009 | Henderson ......... H01R 13/6275 439/350 |
| 8,251,706 B2 | 8/2012 | Shuai |
| 2014/0159638 A1 | 6/2014 | Ebersold |
| 2014/0235075 A1 | 8/2014 | Kim et al. |

FOREIGN PATENT DOCUMENTS

CN         103813231 A      5/2014

* cited by examiner

*Primary Examiner* — Edwin A. Leon
(74) *Attorney, Agent, or Firm* — Muncy, Geissler, Olds & Lowe, P.C.

(57) ABSTRACT

A multifunctional crown is provided on a wearable device or smart watch for various types of connections with external devices through stereo audio ports, audio/video ports, or data ports such as Universal Serial Bus (USB) ports for transfer of audio, video or data signals.

30 Claims, 6 Drawing Sheets

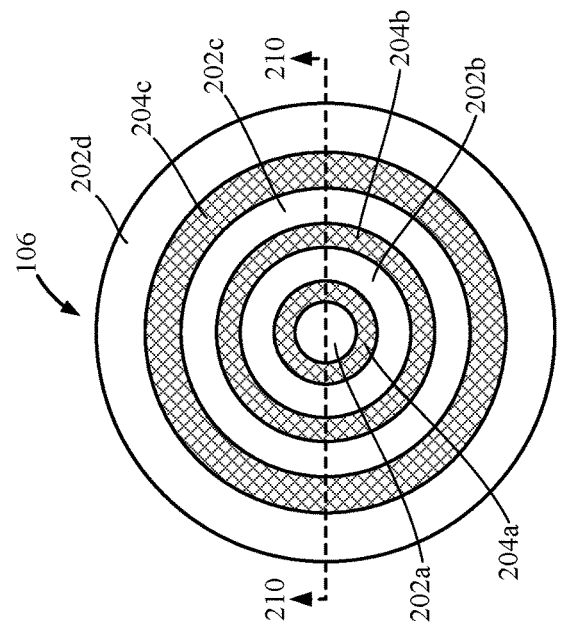
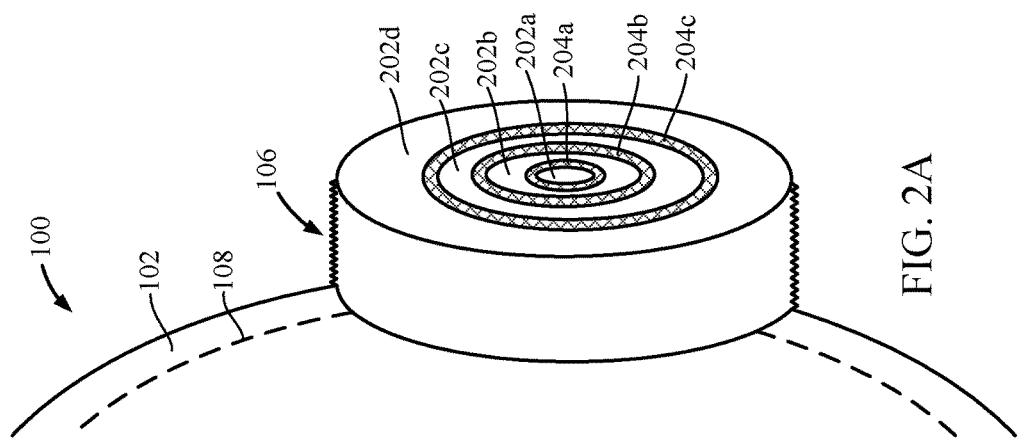

MULTIPURPOSE MAGNETIC CROWN ON WEARABLE DEVICE AND ADAPTER FOR POWER SUPPLY AND AUDIO, VIDEO AND DATA ACCESS

FIELD OF DISCLOSURE

Various examples described herein relate to wearable devices, and more particularly, to multipurpose crowns on wearable devices and adapters for power supply and audio, video and data access.

BACKGROUND

Wearable devices such as smart watches usually have relatively small form factors compared to typical mobile phones due to the requirement that they need to be conveniently worn on a certain part of a human body, such as a wrist. Because wearable devices such as smart watches are typically thin devices with small surface areas, there are serious physical constraints on the placement of access ports on such devices, for various functions such as battery charging, audio/video access, and data access, for example. Because the form factors for wearable devices are usually small, the number of access ports for battery charging, audio/video access or data access would be severely limited. The sizes of access ports for such wearable devices also need to be small. Moreover, space may not be practically available for any power, audio/video or data ports on the outer surface of a smart watch, for example, because the outer surface of a smart watch may need to be made available for a display, such as a liquid crystal display (LCD).

In addition to the challenges posed by small form factors, other considerations need to be taken into account in providing access ports for wearable devices or smart watches. For example, a smart watch is expected to be exposed to the environment without covers, and conventional ports for battery charging, audio/video or data typically are not sealed or protected from weather effects.

SUMMARY

Examples of the disclosure are directed to apparatus for transfer of data, audio signals, video signals, or electrical power between a wearable device, such as a smart watch, and an external device, such as an audio device, an audio/video device, or a data device.

In an example, a wearable device is provided, the wearable device comprising: a body; and a multifunctional crown on the body, the multifunctional crown comprising a plurality of concentric conductors, wherein at least some of the concentric conductors is configured to interface with an adapter to transfer at least one of a digital signal, an analog signal and electric power, and wherein at least one of the concentric conductors comprises a magnet to facilitate acceptance of the adapter to said plurality of concentric conductors.

In another example, a connector is provided, the connector comprising: a cable; an interface bus connected to the cable; and a wearable device adapter connected to the cable, the wearable device adapter comprising a center conductor and a plurality of concentric conductors concentric about the center conductor, wherein at least some of the center conductor and the concentric conductors are configured to convey data signals, and wherein at least one of the center conductor and the concentric conductors comprises a magnet to facilitate acceptance of the wearable device adapter to a multifunctional crown of a wearable device.

In another example, a connector is provided, the connector comprising: a cable; a first adapter connected to the cable, first adapter comprising a center conductor and a plurality of concentric conductors concentric about the center conductor, wherein at least some of the center conductor and the concentric conductors are configured to convey audio signals, and wherein at least one of the center conductor and the concentric conductors comprises a magnet to facilitate acceptance of the wearable device adapter to a multifunctional crown of a wearable device; and a second adapter connected to the cable, the second adapter disposed opposite the first adapter.

In yet another example, a connector is provided, the connector comprising: a cable; a first adapter connected to the cable, the first adapter comprising a center conductor and a plurality of concentric conductors concentric about the center conductor, wherein at least one of the center conductor and the concentric conductors is configured to convey an audio signal and at least one of the center conductor and the concentric conductors is configured to convey a video signal, and wherein at least one of the center conductor and the concentric conductors comprises a magnet to facilitate acceptance of the wearable device adapter to a multifunctional crown of a wearable device; and a second adapter connected to the cable, the second adapter disposed opposite the first adapter.

BRIEF DESCRIPTION OF THE DRAWINGS

The accompanying drawings are presented to aid in the description of examples of the disclosure and are provided solely for illustration of the examples and not limitations thereof.

FIG. 2A is an enlarged side perspective view of an example of a multifunctional crown on a smart watch.

FIG. 2B is an end view corresponding to the enlarge side perspective view of the multifunctional crown of FIG. 2A.

DETAILED DESCRIPTION

Figure 1:
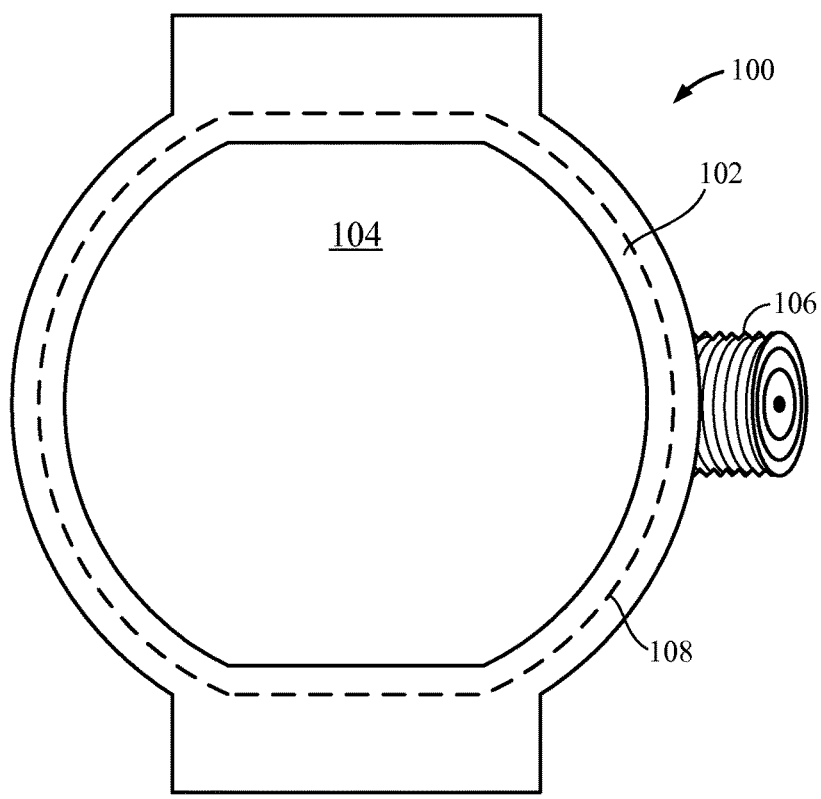
FIG. 1 is a top perspective view of an example of a wearable device such as a smart watch.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any example described herein as "exemplary" is not necessarily to be construed as preferred or advantageous over other examples. Likewise, the term "examples" does not require that all examples include the discussed feature, advantage or mode of operation.

The terminology used herein is for the purpose of describing particular examples only and is not intended to be limiting of the examples. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, and/or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

A standard USB/Mini-USB/Micro-USB connector has a particular polarity, which requires the user to insert such connector in a certain orientation with respect to a matching USB/Mini-USB/Micro-USB port on a device, such a mobile device or a smart watch. Some types of small-form-factor connectors, such as the iPhone® Lightning connector or USB-C connector, are thin rectangular connectors having reversible polarities, but the user still would have to align the connector in order to insert it into the matching port. It is usually difficult for a user to align a small-form-factor connector with a matching port. Moreover, even after the connector is successfully inserted, the device may be placed in various positions on a surface or in an enclosure, such as a pocket or a carrying case, which may create pinching and stress on a standard USB, iPhone® Lightning, or USB-C cable. Therefore, there is a need for a connector and a matching port that allow the user to connect a cable to a device without having to guess the orientation or to fiddle with the connector before it can be inserted.

According to various aspects of the disclosure, examples of which are described below, a cylindrical crown with multi-concentric conductor rings is provided on a wearable device, and a matching cylindrical connector with concentric conductor rings is provided on a cable, to allow the user to insert the connector into the crown of the wearable device without being limited to a certain orientation. Moreover, the cylindrical crown and the matching cylindrical connector with concentric conductor rings allow the cable to spin freely about the axis of the rings, thereby avoiding pinching or mechanical stress on the connector or the cable.

FIG. 1 is a top perspective view of an example of a wearable device, such as a smart watch 100, having a watch body 102 and a watch face 104 on the watch body 102. The watch face 104 may have an electronic display, such as a liquid crystal display (LCD) or a light emitting diode (LED) display, for example. On one side of the watch body 102, a multifunctional crown 106 is provided. In an example, the multifunctional crown 106 may be in a shape and form similar to a crown of a conventional watch, for example. In an example, a waterproof seal 108 is provided in the watch body 102, for example, inside the periphery of the watch body 102, to seal electronic, mechanical or structural components (not shown) inside the watch body 102 from outside elements including water. In a further example, the waterproof seal 108 may be a hermetic seal to prevent gases from entering the wearable device or smart watch. In an example, the components inside the watch body 102 are waterproof sealed from the multifunctional crown 106, which is exposed to the environmental elements. Moreover, in an example which will be described in detail with respect to FIGS. 2A, 2B, 3A and 3B below, the multifunctional crown 106, which comprises a plurality of concentric conductors and a plurality of concentric insulators, is itself waterproof from the environment.

FIG. 2A is an enlarged side perspective view and FIG. 2B is a corresponding end view of an example of a multifunctional crown 106 on a smart watch 100. In FIG. 2A, the multifunctional crown 106 is provided on a side of the body 102 of the smart watch 100. In an example, a waterproof seal 108 is provided within the watch body 102 to prevent water or other external elements from entering the inside of the watch body 102 from the multifunctional crown 106. In a further example, the water proof seal 108 may be a hermetic seal to prevent gases from entering the wearable device or smart watch. In an example, the multifunctional crown 106 comprises a plurality of concentric rings of conductors and a plurality of concentric rings of insulators separating the concentric rings of conductors. In the example shown in FIG. 2A, the multifunctional crown 106 comprises a center conductor 202$a$ having a circular cross section and three additional conductors 202$b$, 202$c$ and 202$d$ each having a circular ring cross section that is concentric about the center conductor 202$a$.

Furthermore, the multifunctional crown 106 in the example shown in FIG. 2A also includes a plurality of insulators 204$a$, 204$b$ and 204$c$ each having a circular ring cross section that is concentric about the center conductor 202$a$. In the example shown in FIG. 2A, the innermost insulator 204$a$ is positioned between the center conductor 202$a$ and the innermost concentric ring conductor 202$b$, the middle insulator 204$b$ is positioned between the innermost concentric ring conductor 202$b$ and the middle concentric ring conductor 202$c$, and the outermost insulator 204$c$ is positioned between the middle concentric ring conductor 202$c$ and the outermost concentric ring conductor 202$d$.

In an example, one or more of the conductors 202$a$, 202$b$, 202$c$ and 202$d$ may be magnetized to provide one or more magnetic surfaces to facilitate the connection of the multifunctional crown 106 with an adapter, such as digital signal adapter, an analog signal adapter, or a power adapter, for example. In a further example, such an adapter may comprise a data adapter, a power adapter, a stereo audio adapter, an audio/video adapter, or any combination thereof, examples of which will be described below with respect to FIGS. 4, 5 and 6. In an example, at least one of the conductors 202$a$, 202$b$, 202$c$ and 202$d$ is magnetized to provide a magnetic outer surface for easy connection with an adapter. In a further example, at least the outermost concentric ring conductor 202$d$ is magnetized because the outermost concentric ring conductor 202$d$ is likely to have the greatest contact area among the center and concentric ring conductors 202$a$, 202$b$, 202$c$ and 202$d$ in the multifunctional crown 106. FIG. 2B is an end view corresponding to the enlarged side perspective view of the multifunctional crown 106 of FIG. 2A.

Figure 3A:
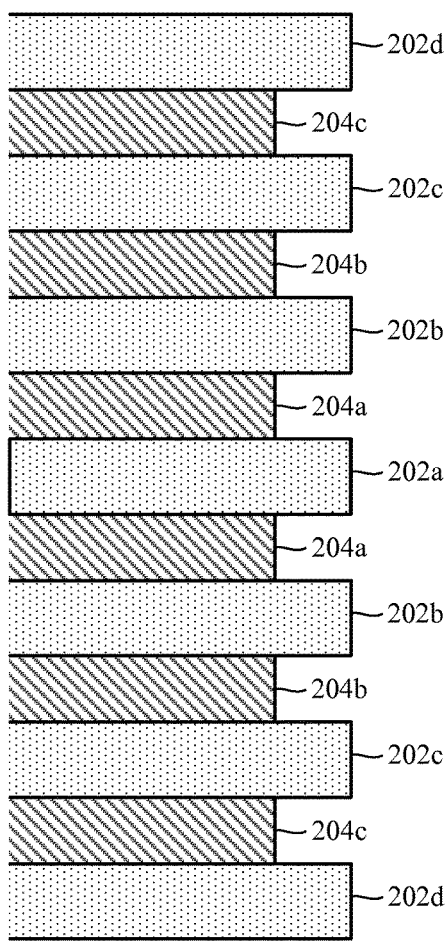
FIG. 3A illustrates a side sectional view of an example of the multifunctional crown of FIGS. 2A and 2B serving as a male connector.
Figure 3B:
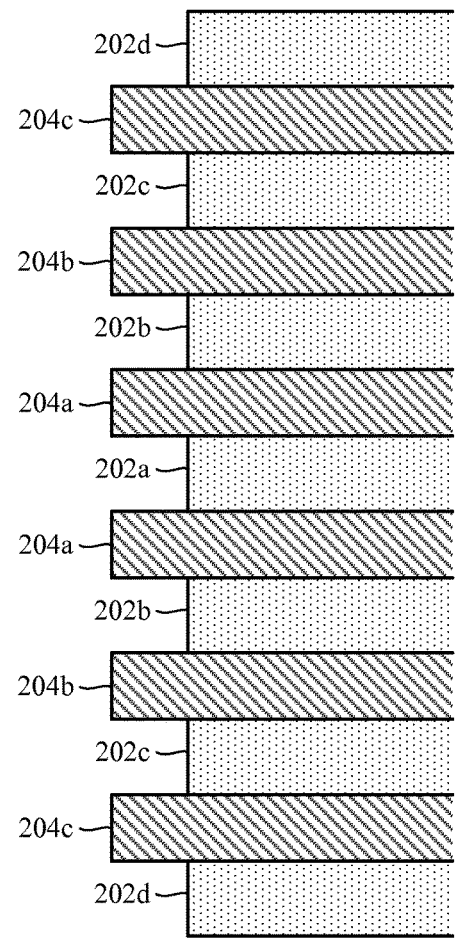
FIG. 3B illustrates a side sectional view of another example of the multifunctional crown of FIGS. 2A and 2B serving as a female connector.

FIGS. 3A and 3B illustrate two different examples of side sectional views of the multifunctional crown 106 taken along sectional line 210 in FIG. 2B. The side sectional view of an example of the multifunctional crown 106 as shown in FIG. 3A may be regarded as a male connector, whereas the side sectional view of another example of the multifunctional crown 106 as shown in FIG. 3B may be regarded as a female connector. In an example in which the multifunctional crown 106 comprises a male connector as shown in FIG. 3A, the end surfaces of the insulators 204a, 204b and 204c are recessed from the end surfaces of the conductors 202a, 202b, 202c and 202d. In contrast, in another example in which the multifunctional crown 106 comprises a female connector as shown in FIG. 3B, the end surfaces of the insulators 204a, 204b and 204c protrude from the end surfaces of the conductors 202a, 202b, 202c and 202d.

In an example, the male connector as shown in FIG. 3A may be implemented as a multifunctional crown on a wearable device or smart watch while the female connector as shown in FIG. 3B may be implemented as an adapter, which may be a data adapter, a power adapter, a stereo audio adapter, an audio/video adapter, or any combination thereof, which may be easily connected to or removed from the male multifunctional crown as shown in FIG. 3A. In another example, the roles of the male connector of FIG. 3A and the female connector of FIG. 3B may be reversed. For example, the female connector as shown in FIG. 3B may be implemented as a multifunctional crown on a wearable device or smart watch while the male connector as shown in FIG. 3A may be implemented as an adapter which may be easily connected to or removed from the female multifunctional crown as shown in FIG. 3B.

In an example, at least one of the conductors 202a, 202b, 202c and 202d in at least one of the male and female connectors as shown in FIGS. 3A and 3B comprises a magnet to facilitate the connection between the male and female connectors. Furthermore, because the male and female connectors as shown in FIGS. 3A and 3B have circular cross sections with concentric rings of insulators and conductors, the angular orientations of the male and female connectors with respect to one another in the end view of FIG. 2B are irrelevant when the adapter is plug into or unplugged from the multifunctional crown. The wearable device user thus may easily make connections or disconnections between the adapter and the multifunctional crown on the wearable device. Furthermore, as shown in the examples illustrated in FIGS. 2A, 2B, 3A and 3B, regardless of whether a multifunctional crown 106 comprises a male or female connector, there are no gaps between adjacent insulators and conductors in the concentric ring configuration, and thus the multifunctional crown provides waterproof protection for the wearable device or smart watch 100.

Figure 4:
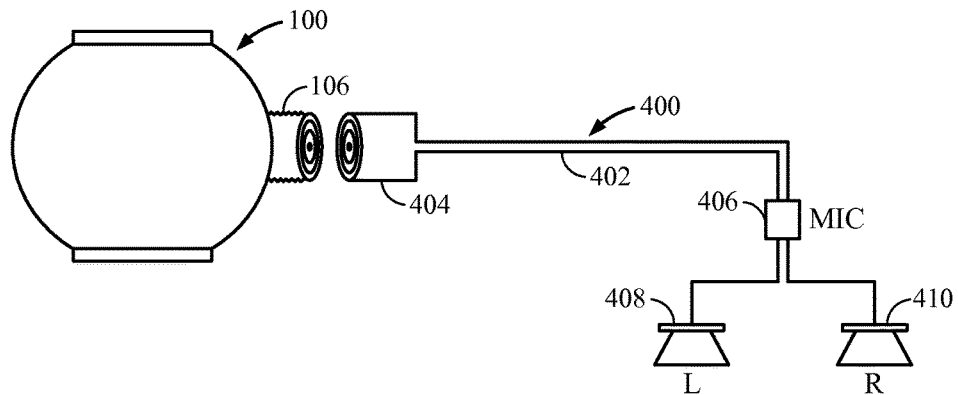
FIG. 4 illustrates an example of a connection between a multifunctional crown and a stereo audio connector.

FIG. 4 illustrates an example of a connection between a multifunctional crown 106 on a smart watch 100 and a stereo audio connector 400. In the example shown in FIG. 4, the stereo audio connector 400 comprises a cable 402, a wearable device adapter 404 connected to one end of the cable 402, and a microphone 406 and left and right speakers 408 and 410 connected to the other end of the cable 402. In an example, the multifunctional crown 106 comprises four conductors including a center conductor having a circular cross section and three additional conductors having circular ring cross sections concentric about the center conductor, an example of which is shown in FIGS. 2A, 2B, 3A and 3B and described above.

Referring to FIGS. 2A and 2B, which depict a multifunctional crown with four conductors 202a, 202b, 202c and 202d, the center conductor 202a may serve as the electrical connection for the left speaker, the innermost concentric ring conductor 202b may serve as the electrical connection for the right speaker, the middle concentric ring conductor 202c may serve as the electrical connection for the microphone, and the outermost concentric ring conductor 202d may serve as ground, for example. In other examples, the electrical functions of the conductors 202a, 202b, 202c and 202d may be designated in various manners within the scope of the disclosure.

Referring to FIG. 4, if the multifunctional crown 106 on the smart watch 100 is male, then the wearable device adapter 404 on the stereo audio connector 400 is female. On the other hand, if the multifunctional crown 106 on the smart watch 100 is female, then the wearable device adapter 404 is male. Regardless of whether the multifunctional crown 106 comprises a male or female connector, the wearable device adapter 404 on the stereo audio connector 400 has matching center and concentric ring conductors and concentric ring insulators with the same end view as that of the multifunctional crown. For example, if the multifunctional crown 106 on the smart watch 100 as shown in FIG. 4 has four conductors and three insulators with an end view as shown in FIG. 2B, then the matching wearable device adapter 404 on the stereo audio connector 400 would have the same end view. In an example, at least one of the conductors of the multifunctional crown 106 or of the wearable device adapter 404 in FIG. 4 is magnetized to allow the user to engage the wearable device adapter 404 with the multifunctional crown 106 with ease.

Figure 5:
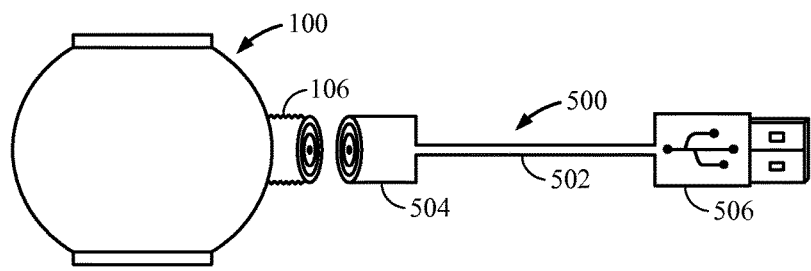
FIG. 5 illustrates an example of a connection between a multifunctional crown and a Universal Serial Bus (USB) connector.

FIG. 5 illustrates an example of a connection between a multifunctional crown 106 on a smart watch 100 and a Universal Serial Bus (USB) connector 500. In the example shown in FIG. 5, the USB connector 500 comprises a cable 502, a wearable device adapter 504 connected to one end of the cable 502, and a USB 506 connected to the other end of the cable 502. In an example, the multifunctional crown 106 comprises four conductors including a center conductor having a circular cross section and three additional conductors having circular ring cross sections concentric about the center conductor, an example of which is shown in FIGS. 2A, 2B, 3A and 3B and described above.

It is well known to persons skilled in the art that a USB typically includes two data ports, a power supply port and a ground port. Detailed physical structure of the ports inside the USB are also well known to persons skilled in the art and are thus omitted in FIG. 5 for simplicity of illustration. In an example in which the multifunctional crown 106 on the smart watch 100 and the matching wearable device adapter 504 on the USB connector 500 each comprise four conductors, an example of which is shown in the end view of FIG. 2B and described above, two of the conductors 202a, 202b, 202c and 202d may be configured to convey data signals to or from the two data ports of the USB, one of the conductors 202a, 202b, 202c and 202d may be coupled to the power supply port of the USB, and one of the conductors 202a, 202b, 202c and 202d may be coupled to the ground port of the USB, for example. In an example, the outermost concentric ring conductor 202d may be coupled to the ground port of the USB, for example, while one of the conductors 202a, 202b and 202c may be coupled to the power supply port of the USB and the remaining two of the conductors 202*a*, 202*b* and 202*c* may be coupled to the two data ports of the USB. In alternate examples, the electrical functions of the conductors 202*a*, 202*b*, 202*c* and 202*d* may be designated in various other manners within the scope of the disclosure.

Referring to FIG. 5, if the multifunctional crown 106 on the smart watch 100 is male, then the wearable device adapter 504 on the USB connector 500 is female. On the other hand, if the multifunctional crown 106 on the smart watch 100 is female, then the wearable device adapter 504 is male. Regardless of whether the multifunctional crown 106 comprises a male or female connector, the wearable device adapter 504 on the USB connector 500 has matching center and concentric ring conductors and concentric ring insulators with the same end view as that of the multifunctional crown. For example, if the multifunctional crown 106 on the smart watch 100 as shown in FIG. 5 has four conductors and three insulators with an end view as shown in FIG. 2B, then the matching wearable device adapter 504 on the USB connector 500 would have the same end view. In an example, at least one of the conductors of the multifunctional crown 106 or of the wearable device adapter 504 in FIG. 5 is magnetized to facilitate the acceptance of the wearable device adapter 504 to the multifunctional crown 106 of the smart watch 100.

In an example, the USB connector 500 with the wearable device adapter 504 as shown in FIG. 5 may be used for charging the battery of the wearable device or smart watch 100 through the power supply port of the USB 506 when the USB 506 is connected to any device that is capable of supplying power. In an example, the USB connector 500 with the wearable device adapter 504 as shown in FIG. 5 may also be used for transferring data to or from the wearable device or smart watch 100 through the two data ports of the USB 506. For example, the data ports of the USB 506 may transfer serial data to or from the smart watch 100, download software for the smart watch 100, or transfer video, audio or other data to or from the smart watch 100. The USB 506 may be connected to a desktop computer, a laptop computer, a tablet, a mobile device, a smart phone, or another type of device, for example.

Figure 6:
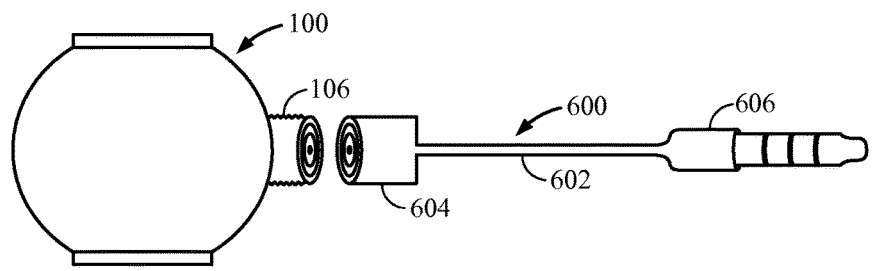
FIG. 6 illustrates an example of a connection between a multifunctional crown and an audio or audio/video connector.

FIG. 6 illustrates an example of a connection between a multifunctional crown 106 on a smart watch 100 and an audio or audio/video connector 600. In the example shown in FIG. 6, the audio or audio/video connector 600 comprises a cable 602, a wearable device adapter 604 connected to one end of the cable 602, and an audio or audio/video jack 606 connected to the other end of the cable 602. The audio or audio/video jack 606 may be a standard 3.5 mm or 2.5 mm jack, or another type of coaxial audio or audio/video jack, for example. Although FIG. 6 illustrates a male coaxial audio or audio/video jack, in an alternate example a female jack may be provided at the end of the cable 602 for connecting to a headset, for example.

In an example, the multifunctional crown 106 comprises four conductors including a center conductor having a circular cross section and three additional conductors having circular ring cross sections concentric about the center conductor, an example of which is shown in FIGS. 2A, 2B, 3A and 3B and described above. Referring to the end view of FIG. 2B, in an example in which the connector 600 is a stereo audio connector, the center conductor 202*a* may be configured to convey audio signals in the left audio channel of a stereo sound, whereas the innermost concentric ring conductor 202*b* may be configured to convey audio signals in the right audio channel of the stereo sound, for example. In an example, the middle concentric ring conductor 202*c* may be configured to convey microphone signals, whereas the outermost concentric ring conductor 202*d* may be coupled to the ground terminal of the stereo audio jack, for example. Alternatively, the electrical functions of the conductors 202*a*, 202*b*, 202*c* and 202*d* may be designated in various other manners within the scope of the disclosure.

In another example in which the connector 600 is an audio/video connector, the center conductor 202*a* may be configured to convey audio signals in the left audio channel and the innermost concentric ring conductor 202*b* may be configured to convey audio signals in the right audio channel of a stereo sound in a manner similar to the example of the stereo audio connector described above, for example. In an audio/video connector, the middle concentric ring conductor 202*c* may be configured to convey video signals, for example, whereas the outermost concentric ring conductor 202*d* may be coupled to the ground terminal of the audio/video jack, for example.

Referring to FIG. 6, if the multifunctional crown 106 on the smart watch 100 is male, then the wearable device adapter 604 on the audio/video connector 600 is female. On the other hand, if the multifunctional crown 106 on the smart watch 100 is female, then the wearable device adapter 604 is male. Regardless of whether the multifunctional crown 106 comprises a male or female connector, the wearable device adapter 604 on the audio/video connector 600 has matching center and concentric ring conductors and concentric ring insulators with the same end view as that of the multifunctional crown. For example, if the multifunctional crown 106 on the smart watch 100 as shown in FIG. 4 has four conductors and three insulators with an end view as shown in FIG. 2B, then the matching wearable device adapter 604 on the audio/video connector 600 would have the same end view. In an example, at least one of the conductors of the multifunctional crown 106 or of the wearable device adapter 604 in FIG. 6 is magnetized to facilitate the engagement of the wearable device adapter 604 to the multifunctional crown 106.

Figure 7:
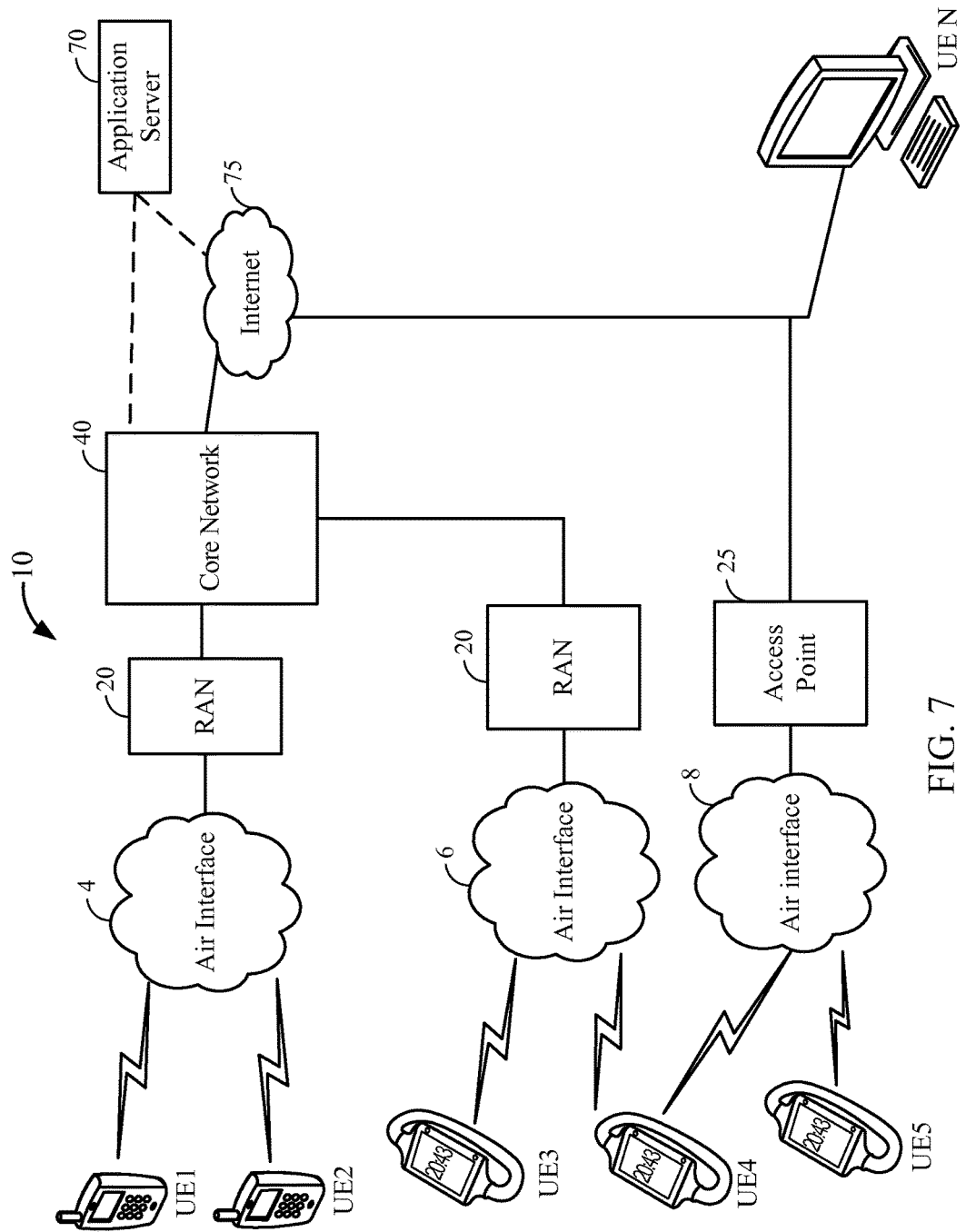
FIG. 7 illustrates a high-level system architecture of a wireless communications system in which one or more wearable devices according to examples of the disclosure may be implemented.

FIG. 7 illustrates a high-level system architecture of a wireless communications system 10 in which wearable devices or smart watches according to examples of the disclosure may be used. The wireless communications system 10 contains mobile devices, also called user equipment UE1 . . . UE N. The user equipment UE 1 . . . UE N may include cellular telephones, personal digital assistant (PDAs), pagers, a laptop computer, a desktop computer, and so on, as well as wearable devices or smart watches with wireless connectivity. For example, in FIG. 7, UE1 . . . UE2 are illustrated as cellular telephones, UE3 . . . UE5 are illustrated as wearable devices or smart watches, and UE N is illustrated as a desktop computer or PC.

Referring to FIG. 7, UEs 1 . . . N are configured to communicate with an access network (e.g., the radio access network RAN 20, an access point 25, etc.) over a physical communications interface or layer, shown in FIG. 7 as air interfaces 4, 6, 8 and/or a direct wired connection. The air interfaces 4 and 6 can comply with a given cellular communications protocol (e.g., CDMA, EVDO, eHRPD, GSM, EDGE, W-CDMA, LTE, etc.), while the air interface 8 can comply with a wireless IP protocol (e.g., IEEE 802.11). The RAN 20 includes a plurality of access points that serve UEs over air interfaces, such as the air interfaces 4 and 6. The access points in the RAN 20 can be referred to as access nodes or ANs, access points or APs, base stations or BS s, Node Bs, eNode Bs, and so on. These access points can be terrestrial access points (or ground stations), or satellite access points. The RAN 20 is configured to connect to a core network 40 that can perform a variety of functions, including bridging circuit switched (CS) calls between UEs served by the RAN 20 and other UEs served by the RAN 20 or a different RAN altogether, and can also mediate an exchange of packet-switched (PS) data with external networks such as Internet 75. The Internet 75 includes a number of routing agents and processing agents (not shown in FIG. 7 for the sake of convenience). In FIG. 7, UE N is shown as connecting to the Internet 75 directly (i.e., separate from the core network 40, such as over an Ethernet connection of WiFi or 802.11-based network). The Internet 75 can thereby function to bridge packet-switched data communications between UE N and UEs 1 . . . N via the core network 40. Also shown in FIG. 1 is the access point 25 that is separate from the RAN 20. The access point 25 may be connected to the Internet 75 independent of the core network 40 (e.g., via an optical communication system such as FiOS, a cable modem, etc.). The air interface 8 may serve UE 4 or UE 5 over a local wireless connection, such as IEEE 802.11 in an example. UE N is shown as a desktop computer with a wired connection to the Internet 75, such as a direct connection to a modem or router, which can correspond to the access point 25 itself in an example (e.g., for a WiFi router with both wired and wireless connectivity).

Referring to FIG. 7, a server 70 is shown as connected to the Internet 75, the core network 40, or both. The server 70 can be implemented as a plurality of structurally separate servers, or alternately may correspond to a single server. As will be described below in more detail, the server 70 is configured to support one or more communication services (e.g., Voice-over-Internet Protocol (VoIP) sessions, Push-to-Talk (PTT) sessions, group communication sessions, social networking services, etc.) for UEs that can connect to the server 70 via the core network 40 and/or the Internet 75, and/or to provide content (e.g., web page downloads) to the UEs.

Figure 8:
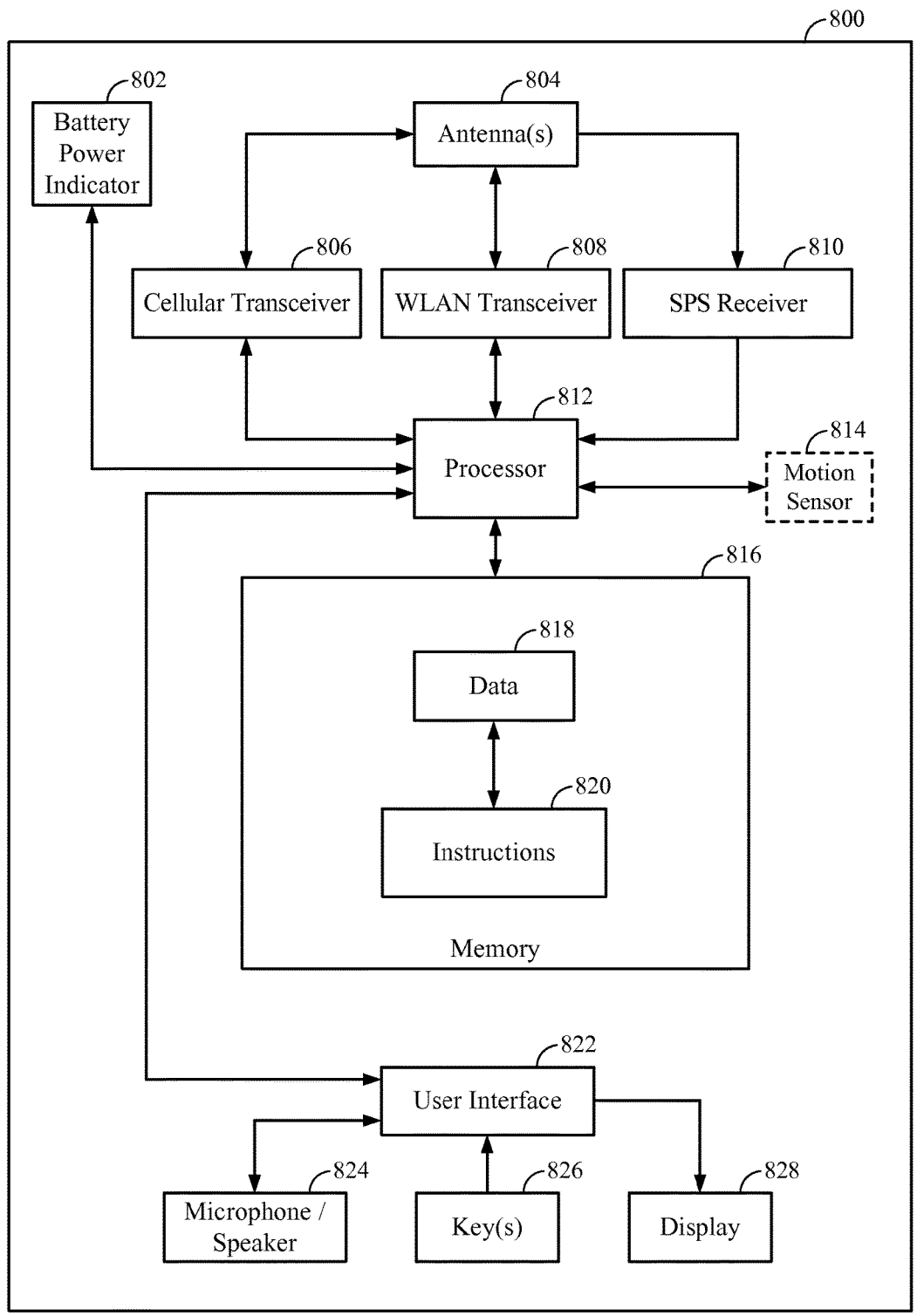
FIG. 8 is a block diagram illustrating examples of functional blocks of a wearable device.

FIG. 8 is a block diagram illustrating examples of functional blocks that may be included in a wearable device 800. The wearable device 800 as shown in FIG. 8 may be a mobile phone, a smartphone, a handheld computer, a tablet, a wearable device, a smart watch, or any type of device capable of interacting with a user, for example. In the example shown in FIG. 8, the wearable device 800 may comprise a battery power indicator 802, one or more antennas 804, a cellular transceiver 806, a wireless local area network (WLAN) transceiver 808, such as a Wi-Fi transceiver, and a satellite positioning system (SPS) receiver 810. The SPS receiver 810 may be compatible with Global Positioning System (GPS), Global Navigation Satellite System (GLONASS), or any other global or regional satellite based positioning system. Furthermore, the wearable device 800 may include additional transceivers such as Bluetooth, ZigBee and other types of transceivers not shown in FIG. 8. Accordingly, the elements illustrated for the wearable device 800 are provided merely as an exemplary configuration and are not intended to limit the configuration of wearable devices in accordance with the various aspects disclosed herein.

In the example shown in FIG. 8, a processor 812 is coupled to the battery power indicator 802, the cellular transceiver 806, the WLAN transceiver 808 and the SPS receiver 810. Optionally, a motion sensor 814 and other sensors may also be coupled to the processor 812. A memory 816 is coupled to the processor 812. The memory 816 may include data 818 as well as stored instructions 820 to be executed by the processor 812 to perform the process steps according to examples of the disclosure.

Furthermore, the wearable device 800 may also include a user interface 822, which may include hardware and software for interfacing inputs or outputs of the processor 812 with the user through light, sound or tactile inputs or outputs, for example. In the example shown in FIG. 8, the wearable device 800 includes a microphone/speaker 824, one or more keys 826, and a display 828 coupled to the user interface 822. Alternatively, the user's tactile input or output may be integrated with the display 828 by using a touch-screen display, for example. Once again, the elements illustrated in FIG. 8 are not intended to limit the configuration of the wearable devices disclosed herein, and it will be appreciated that the elements included in the wearable device 800 may vary based on the end use of the device and the design choices of system engineers.

While the foregoing disclosure shows illustrative examples, it should be noted that various changes and modifications could be made herein without departing from the scope of the appended claims. The functions, steps or actions of the method claims in accordance with examples described herein need not be performed in any particular order unless expressly stated otherwise. Furthermore, although elements may be described or claimed in the singular, the plural is contemplated unless limitation to the singular is explicitly stated.

What is claimed is:

1. A wearable device, comprising:
    a body; and
    a multifunctional crown on the body, the multifunctional crown comprising a plurality of concentric conductors, wherein at least some of the concentric conductors are configured to interface with an adapter to transfer at least one of a digital signal, an analog signal or electric power.

2. The wearable device of claim 1, wherein at least one of the concentric conductors comprises a magnet to facilitate acceptance of the adapter to the plurality of concentric conductors.

3. The wearable device of claim 1, wherein the multifunctional crown further comprises a plurality of concentric insulators, each of the concentric insulators positioned between two of the concentric conductors.

4. The wearable device of claim 1, wherein the digital signal comprises a data signal.

5. The wearable device of claim 1, wherein the analog signal comprises an audio signal.

6. The wearable device of claim 1, wherein the analog signal comprises a video signal.

7. The wearable device of claim 1, wherein the multifunctional crown comprises a connector selected from the group consisting of a male connector and a female connector.

8. The wearable device of claim 1, wherein the at least one of the concentric conductors that comprises a magnet comprises a magnetic surface.

9. The wearable device of claim 1, wherein the at least one of the concentric conductors that comprises a magnet is an outermost conductor among the concentric conductors.

10. The wearable device of claim 1, wherein the multifunctional crown further comprises a center conductor, and wherein the concentric conductors are concentric about the center conductor.

11. The wearable device of claim 10, wherein the concentric conductors comprise three concentric conductors.

12. The wearable device of claim 11, wherein the center conductor and the three concentric conductors include two conductors configured to convey audio signals in left and right audio channels of a stereo sound in an audio adapter.

13. The wearable device of claim 12, wherein the center conductor and the three concentric conductors further include one conductor configured to convey a microphone signal.

14. The wearable device of claim 12, wherein the center conductor and the three concentric conductors further include one conductor configured to be coupled to a ground terminal of the audio adapter.

15. The wearable device of claim 12, wherein the audio adapter comprises a headset adapter.

16. The wearable device of claim 11, wherein one of the center conductor and the three concentric conductors is configured to convey a video signal in a video adapter.

17. The wearable device of claim 16, wherein the video adapter comprises a 3.5 mm audio and video adapter.

18. The wearable device of claim 11, wherein the center conductor and the three concentric conductors include two conductors configured to be coupled to two data ports of a universal serial bus (USB).

19. The wearable device of claim 18, wherein the center conductor and the three concentric conductors further include one conductor configured to be coupled to a power supply port of the USB.

20. The wearable device of claim 18, wherein the center conductor and the three concentric conductors further include one conductor configured to be coupled to a ground port of the USB.

21. The wearable device of claim 1, wherein the body is waterproof sealed from the multifunctional crown.

22. The wearable device of claim 21, wherein the body is hermetically sealed from the multifunctional crown.

23. The wearable device of claim 1, wherein the wearable device comprises a watch.

24. A connector, comprising:
 a cable; and
 a wearable device adapter connected to the cable and configured to connect to a multifunctional crown on a wearable device, the wearable device adapter comprising conductor portions including a center conductor and a plurality of concentric conductors concentric about the center conductor, wherein different ones of the conductor portions are configured to transfer each of a digital signal, an analog signal or electric power.

25. The connector of claim 24, wherein at least one of the center conductor and the concentric conductors comprises a magnet to facilitate acceptance of the wearable device adapter to the multifunctional crown of the wearable device.

26. The connector of claim 24, wherein the one or more conductor portions of the wearable device adapter are configured to transfer an audio signal.

27. The connector of claim 24, wherein the one or more conductor portions of the wearable device adapter are configured to transfer a video signal.

28. A connector, comprising:
 means for connecting to a multifunctional crown on a wearable device, means for connecting comprising conductor portions including a center conductor and a plurality of concentric conductors concentric about the center conductor, wherein different ones of the conductor portions are configured to transfer each one of a digital signal, an analog signal or electric power.

29. A wearable device, comprising:
 means for facilitating an exchange of one or more of a digital signal, an analog signal or electrical power, wherein the means for facilitating the exchange of one or more of the digital signal includes a plurality of concentric conductors,
 wherein at least some of the concentric conductors are configured to interface with an adapter to transfer at least one of a digital signal, an analog signal or electric power.

30. The wearable device of claim 3, wherein the plurality of concentric conductors are recessed with respect to the plurality of concentric insulators.

* * * * *